(12) United States Patent  (10) Patent No.: US 12,444,784 B2
Qin et al.                   (45) Date of Patent:     Oct. 14, 2025

(54) METHOD AND SYSTEM FOR DETERMINING PARAMETERS OF BATTERY PULSED HEATING

(71) Applicant: SHELL OIL COMPANY, Houston, TX (US)

(72) Inventors: Yudi Qin, Beijing (CN); Languang Lu, Beijing (CN); Zhengyu Chu, Beijing (CN); Jinhai Liu, Beijing (CN); Minggao Ouyang, Beijing (CN); Jianqiu Li, Beijing (CN)

(73) Assignee: SHELL USA, INC., Houston, TX (US)

( * ) Notice: Subject to any disclaimer, the term of this patent is extended or adjusted under 35 U.S.C. 154(b) by 799 days.

(21) Appl. No.: 17/631,175

(22) PCT Filed: Aug. 27, 2020

(86) PCT No.: PCT/EP2020/073967
§ 371 (c)(1),
(2) Date: Jan. 28, 2022

(87) PCT Pub. No.: WO2021/037975
PCT Pub. Date: Mar. 4, 2021

(65) Prior Publication Data
US 2022/0271358 A1   Aug. 25, 2022

(30) Foreign Application Priority Data
Aug. 29, 2019 (CN) .......................... 201910806436.2

(51) Int. Cl.
*H01M 10/615* (2014.01)
*H01M 4/40* (2006.01)
(Continued)

(52) U.S. Cl.
CPC ......... *H01M 10/615* (2015.04); *H01M 4/405* (2013.01); *H01M 10/0525* (2013.01);
(Continued)

(58) Field of Classification Search
None
See application file for complete search history.

(56) References Cited

U.S. PATENT DOCUMENTS 6,441,588 B1    8/2002  Yagi et al.

FOREIGN PATENT DOCUMENTS

CN   106450537 A   2/2017
CN   108199122 A   6/2018
(Continued)

OTHER PUBLICATIONS

International Search Report and Written Opinion received for PCT Patent Application No. PCT/EP2020/073967, mailed on Nov. 27, 2020, 10 pages.
(Continued)

*Primary Examiner* — Tracy M Dove
(74) *Attorney, Agent, or Firm* — SHELL USA, INC.

(57) ABSTRACT

The present application relates to a method and system for determining parameters of battery pulsed heating. The reference potential of the anode of the lithium-ion battery is obtained in real time in the positive and negative pulsed heating process under various heating parameters. The relationship between reference potential and threshold potential indicates whether Li plating has occurred to the lithium-ion battery. When the reference potential is smaller than the threshold potential, the first heating parameters are adjusted to avoid Li plating and improve battery life. By recording the heating parameters when the reference potential is greater than the threshold potential, it can be ensured that the pulsed heating parameters have no significant impact on the life of the battery.

5 Claims, 3 Drawing Sheets

(51) Int. Cl.
*H01M 10/0525* (2010.01)
*H01M 10/48* (2006.01)
*H01M 10/625* (2014.01)
*H01M 10/63* (2014.01)
*H01M 10/657* (2014.01)

(52) U.S. Cl.
CPC ......... *H01M 10/48* (2013.01); *H01M 10/486* (2013.01); *H01M 10/625* (2015.04); *H01M 10/63* (2015.04); *H01M 10/657* (2015.04); *H01M 2220/20* (2013.01)

(56) References Cited

FOREIGN PATENT DOCUMENTS

| | | | |
|---|---|---|---|
| JP | 2012152057 | A | 8/2012 |
| JP | 2013054939 | A | 3/2013 |
| JP | 2013077452 | A | 4/2013 |
| JP | 2016220279 | A | 12/2016 |

OTHER PUBLICATIONS

Office Action Received for Japanese Application No. 2022-509658, Mailed on Jul. 10, 2024, 07 Pages(04 Pages of English Translation and 03 Pages of Official Copy).

METHOD AND SYSTEM FOR DETERMINING PARAMETERS OF BATTERY PULSED HEATING

CROSS REFERENCE TO RELATED APPLICATIONS

This is a National stage application of International application No. PCT/EP2020/073967, filed Aug. 27, 2020, which claims priority of CN application No. 201910806436.2, filed 29 Aug. 2019 which is incorporated herein by reference in its entirety.

TECHNICAL FIELD

The present application relates to the technical field of battery management, particularly to a method and system for determining parameters of battery pulsed heating.

PRIOR ART

With the wide application of lithium-ion battery vehicles, battery electric vehicles in particular, the performance of the vehicles will closely depend on the performance of lithium-ion batteries. Scenarios of charging at low temperatures are getting more frequent. The problems faced by lithium-ion batteries in a low temperature environment have had a huge impact on their practical applications. The low temperature environment will reduce the available energy of the battery and cause energy loss during discharge, and it will also lead to attenuation of the battery life in the full life cycle. At the same time, the low temperature environment will also increase the impedance of the battery, thereby affecting the life and safety of the battery. These problems have brought great difficulties to the use of the battery in a low temperature environment.

In order to solve the aforementioned problems, the battery can be effectively heated by the pulsed heating method prior to its working cycle. However, in the process of internal heating of the battery by pulsed heating current, it is necessary to understand the changes inside the battery, so as to ensure pulsed heating parameters will not have significant impact on the life of the battery.

SUMMARY OF THE INVENTION

To address the issue that in the process of internal heating of the battery by the pulsed heating current, it is necessary to understand the changes inside the battery, so as to ensure that pulsed heating parameters will not have significant impact on the life of the battery, a method and system for determining parameters of battery pulsed heating are provided.

A method for determining parameters of battery pulsed heating, comprising:

S100, providing a lithium-ion battery with a reference electrode;

S200, performing positive and negative pulsed heating of the lithium-ion battery under the first heating parameters;

S300, obtaining the reference potential of the anode of the lithium-ion battery in real time in the positive and negative pulsed heating process, where the reference potential of the anode is the voltage difference between the anode of the lithium-ion battery and the reference electrode, and judging whether the reference potential of the anode is smaller than the threshold potential;

S400, when the reference potential of the anode is smaller than the threshold potential, adjusting the first heating parameters and repeating steps S200 to S300 until the first heating parameters are the same as the n-th heating parameters, and the reference potential of the anode is greater than or equal to the threshold potential; and S500, when the reference potential of the anode is greater than the threshold potential, recording the n-th heating parameters.

In one of the embodiments, the step S200 of performing positive and negative pulsed heating of the lithium-ion battery under first heating parameters comprises:

putting the lithium-ion battery into a temperature chamber, adjusting the temperature of the temperature chamber to a first temperature value and letting it stand for a first time value;

charging with a first amplitude value in constant-current mode for a second time value; and discharging with the first amplitude value in constant-current mode for a third time value, and the first heating parameters including the first temperature value, the first amplitude value, the second time value and the third time value.

In one of the embodiments, the step of when the reference potential of the anode is smaller than the threshold potential, adjusting the first heating parameters and repeating steps S200 to S300 until the first heating parameters are the same as the n-th heating parameters, and the reference potential of the anode is greater than or equal to the threshold potential, comprises:

When the reference potential of the anode is smaller than the threshold potential, increasing the first temperature value to a second temperature value, and repeating steps S200 to S300 until the first temperature value is the same as a n-th temperature value, and the reference potential of the anode is greater than or equal to the threshold potential.

In one of the embodiments, when the reference potential of the anode is greater than the threshold potential, the n-th temperature value, the first amplitude value, the second time value and the third time value are recorded.

In one of the embodiments, the step of when the reference potential of the anode is smaller than the threshold potential, adjusting the first heating parameters and repeating steps S200 to S300 until the first heating parameters are the same as the n-th heating parameters, and the reference potential of the anode is greater than or equal to the threshold potential, comprises:

When the reference potential of the anode is smaller than the threshold potential, reducing the first amplitude value to a second amplitude value and repeating steps S200 to S300 until the first temperature amplitude value is the same as a n-th amplitude value, and the reference potential of the anode is greater than or equal to the threshold potential.

In one of the embodiments, when the reference potential of the anode is greater than the threshold potential, the n-th amplitude value, the first temperature value, the second time value and the third time value are recorded.

In one of the embodiments, after the step S500 of when the reference potential of the anode is greater than the threshold potential, recording the n-th heating parameters, the method comprises:

Optimizing the recorded n-th heating parameters to obtain a larger pulsed heating rate.

In one of the embodiments, the reference electrode is one of a lithium metal reference electrode, an alloy reference electrode, a polymer material coated reference electrode and a battery in-situ lithium plating reference electrode.

A system for determining parameters of battery pulsed heating, comprising:

A positive and negative pulsed heating device, electrically connected to a lithium-ion battery with a reference electrode and used for positive and negative pulsed heating of the lithium-ion battery;

An anode reference potential acquisition device, electrically connected to the lithium-ion battery and used to acquire the reference potential of the anode of the lithium-ion battery, which is the voltage difference between the anode of the lithium-ion battery and the reference electrode; and A judging and processing device, electrically connected to the anode reference potential acquisition device and the positive and negative pulsed heating device respectively, used to judge whether the reference potential of the anode is smaller than the threshold potential, sending the positive and negative pulsed heating device a signal for adjustment of heating parameters when the reference potential of the anode is smaller than the threshold potential until the first heating parameters are the same as the n-th heating parameters and the reference potential of the anode is greater than the threshold potential, and recording the n-th heating parameters.

In one of the embodiments, the first heating parameters include a first temperature value, a first amplitude value, a second time value and a third time value, and when the judging and processing device judges that the reference potential of the anode is smaller than the threshold potential, the judging and processing device sends the positive and negative pulsed heating device a signal for adjustment of the first temperature value.

In one of the embodiments, the first heating parameters include a first temperature value, a first amplitude value, a second time value and a third time value, and when the judging and processing device judges that the reference potential of the anode is smaller than the threshold potential, the judging and processing device sends the positive and negative pulsed heating device a signal for adjustment of the first amplitude value.

The aforementioned method for determining parameters of battery pulsed heating obtains the reference potential of the anode of the lithium-ion battery in real time in the positive and negative pulsed heating process under various heating parameters. The reference potential of the anode is the voltage difference between the anode of the lithium-ion battery and the reference electrode. By judging the relationship between the reference potential of the anode and the threshold potential, it is judged whether Li plating has occurred to the lithium-ion battery. Li plating may lead to a decrease in the available capacity of the battery, and puncture of the membrane by dendrite, which causes a short circuit in the battery and induces thermal runaway of the battery, bringing about many hazards such as performance reduction and safety risks. Therefore, when the reference potential of the anode is smaller than the threshold potential, the first heating parameters need to be adjusted to avoid the occurrence of Li plating and improve the life of the battery. By recording the heating parameters when the reference potential of the anode is greater than the threshold potential, it can be ensured that the pulsed heating parameters have no significant impact on the life of the battery.

DESCRIPTION OF REFERENCE SIGNS OF MAIN ELEMENTS IN THE ACCOMPANYING DRAWINGS

System for determining parameters of battery pulsed heating 10.
Positive and negative pulsed heating device 100.
Anode reference potential acquisition device 200.
Judging and processing device 300.

DETAILED DESCRIPTION

In order to make the aforementioned objectives, features and advantages of the present application more evident and easier to understand, specific ways of implementing the present application are described in detail by referring to the accompanying drawings below. In the following description, many details are provided to fully understand the present application. However, the present application can be implemented in many ways that are different from this description, and those skilled in the art can make similar modifications without departing from the spirit of the present application, so the present application is not limited to the specific implementation disclosed below.

It should be noted that when an element is said to be "arranged on" another element, it can be directly on another element or there can be a middle element. When an element is considered to be "connected" to another element, it can be directly connected to another element or there can be a middle element at the same time.

Unless otherwise defined, all technical and scientific terms used herein have the same meanings as commonly understood by those skilled in the technical field to which the present application pertains. The terms used in the specification of the present application herein are intended to describe specific embodiments only and not to limit the present application. The term "and/or" used herein includes any of one or more related listed items and all combinations thereof.

Figure 1:
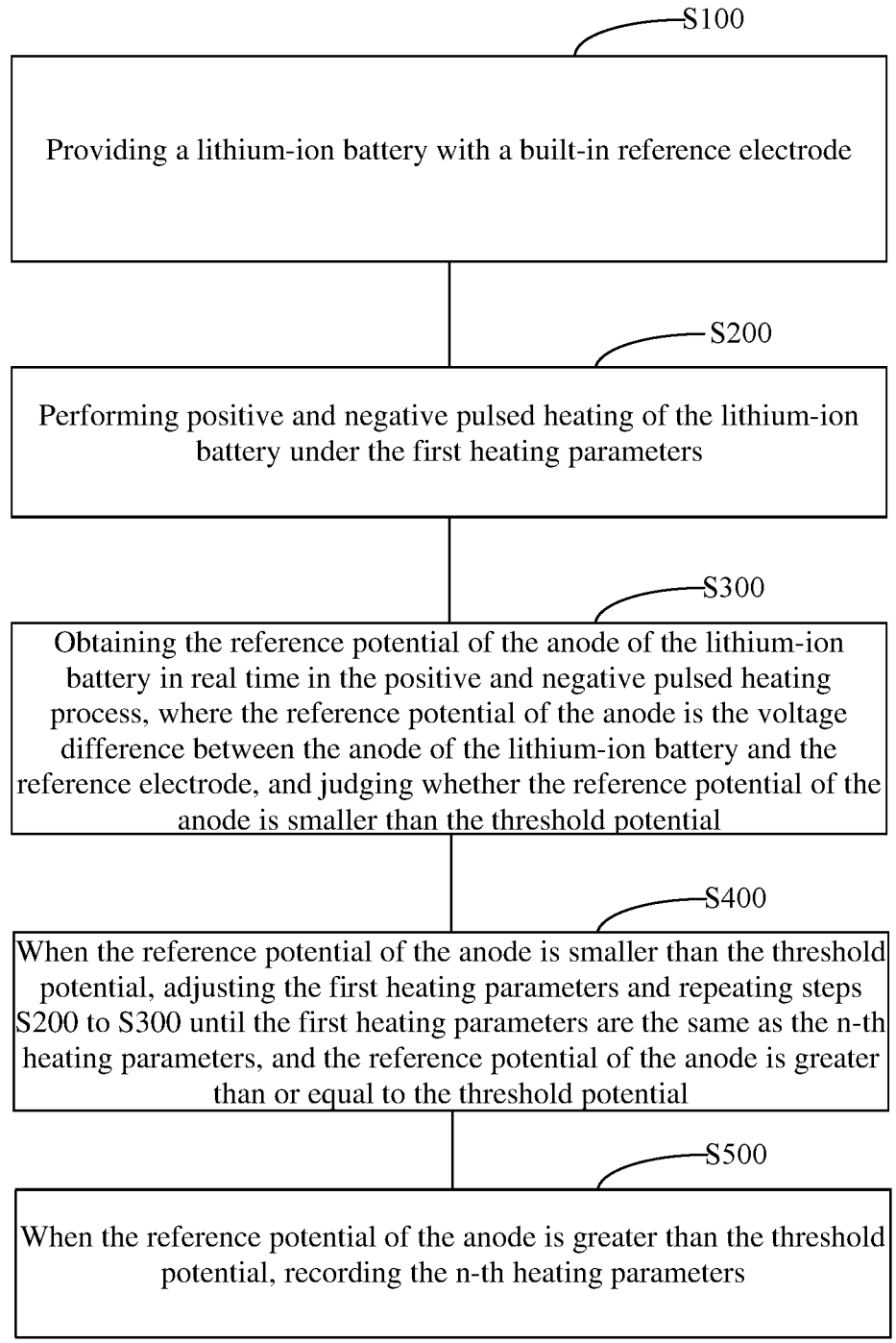
FIG. 1 is a flow diagram of a method for determining parameters of battery pulsed heating provided by an embodiment of the present application.

Please refer to FIG. 1. The present application provides a method for determining parameters of battery pulsed heating. The method comprises:

S100, providing a lithium-ion battery with a reference electrode. The reference electrode is one of a lithium metal reference electrode, an alloy reference electrode, a polymer material coated reference electrode and a battery in-situ lithium plating reference electrode. In an optional embodiment, the reference electrode can be fabricated by in-situ lithium plating with a copper wire, i.e., placing a copper wire inside the battery and inputting a constant current to form a metal plating layer on the surface of the copper wire.

S200, performing positive and negative pulsed heating of the lithium-ion battery under the first heating parameters. At step S200, positive and negative pulsed heating under the first heating parameters can be performed on a plurality of lithium-ion batteries. The step of performing positive and negative pulsed heating of the lithium-ion battery under the first heating parameters can be putting the lithium-ion battery into a temperature chamber, adjusting the temperature of the temperature chamber to a first temperature value and letting it stand for a first time value; charging with a first amplitude value in constant-current mode for a second time value; and discharging with the first amplitude value in constant-current mode for a third time value. The first heating parameters include the first temperature value, the first amplitude value, the second time value and the third time value.

Here, the first temperature value can be 0° C., −5° C., −8° C. or −10° C. There is no limitation to the first time value, as long as it can ensure that the battery temperature and the temperature of the temperature chamber can reach an equilibrium. The first amplitude value can be 4C, 2C, 1.5C, etc. The sum of the second time value and the third time value is the duration of a pulse period. Of course, a pulse interval can be arranged between a charge pulse and a discharge pulse. In this case, the duration of a pulse period is the sum of the second time value, the third time value and the pulse interval.

S300, obtaining the reference potential of the anode of the lithium-ion battery in real time in the positive and negative pulsed heating process, where the reference potential of the anode is the voltage difference between the anode of the lithium-ion battery and the reference electrode, and judging whether the reference potential of the anode is smaller than the threshold potential.

At the step S300, the threshold potential can be set at 0V. When the reference potential of the anode is smaller than the threshold potential, it can be considered that Li plating has occurred to the lithium-ion battery. In this case, pulsed heating under the heating parameters may affect the life of the battery. When the reference potential of the anode is greater than or equal to the threshold potential, it can be considered that Li plating has not occurred to the lithium-ion battery. In this case, it can be considered that pulsed heating under the heating parameters will not affect the life of the battery.

S400, when the reference potential of the anode is smaller than the threshold potential, adjusting the first heating parameters and repeating steps S200 to S300 until the first heating parameters are the same as the n-th heating parameters, and the reference potential of the anode is greater than or equal to the threshold potential. At the step S400, by continuously adjusting the heating parameters, the lithium-ion battery avoids Li plating as far as possible during the pulsed heating process, thereby ensuring that the life of the lithium-ion battery is not affected during the pulsed heating.

S500, when the reference potential of the anode is greater than the threshold potential, recording the n-th heating parameters. A large number of tests can be carried out by the aforementioned method, so as to obtain the heating parameters corresponding to the battery in different states of charge, forming a data table and providing a basis of parameter selection for the popularization and application of the pulsed heating method.

In this embodiment, the aforementioned method for determining parameters of battery pulsed heating obtains the reference potential of the anode of the lithium-ion battery in real time in the positive and negative pulsed heating process under various heating parameters. The reference potential of the anode is the voltage difference between the anode of the lithium-ion battery and the reference electrode. By judging the relationship between the reference potential of the anode and the threshold potential, it is judged whether Li plating has occurred to the lithium-ion battery. Li plating may lead to a decrease in the available capacity of the battery, and puncture of the membrane by dendrite, which causes a short circuit in the battery and induces thermal runaway of the battery, bringing about many hazards such as performance reduction and safety risks. Therefore, when the reference potential of the anode is smaller than the threshold potential, the first heating parameters need to be adjusted to avoid the occurrence of Li plating and improve the life of the battery. By recording the heating parameters when the reference potential of the anode is greater than the threshold potential, it can be ensured that the pulsed heating parameters have no significant impact on the life of the battery.

Figure 2:
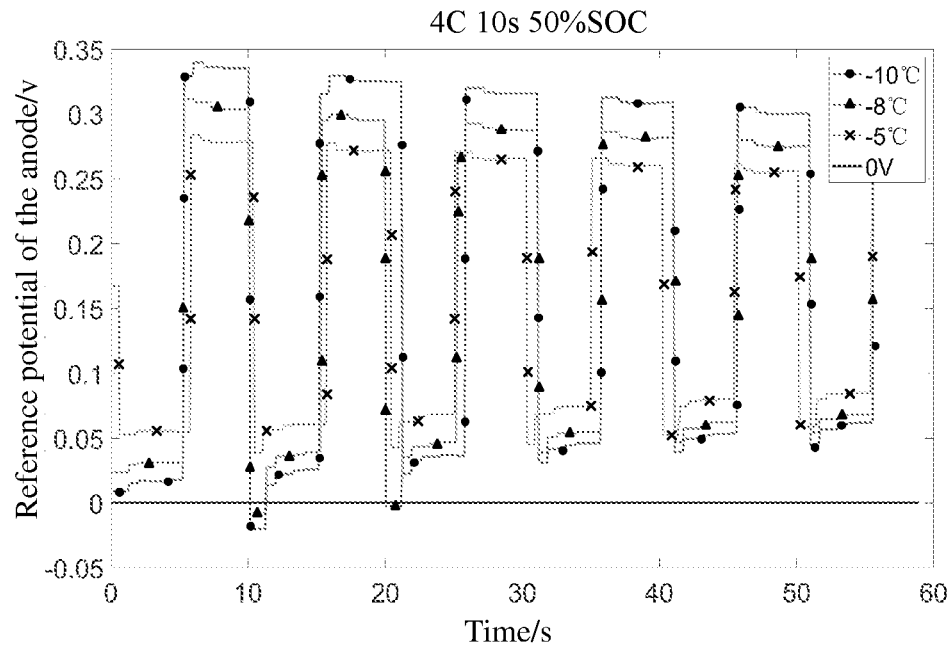
FIG. 2 is a diagram of the test results of the reference potential of the anode provided by an embodiment of the present application, which changes with temperature.

In one of the embodiments, the step of when the reference potential of the anode is smaller than the threshold potential, adjusting the first heating parameters and repeating steps S200 to S300 until the first heating parameters are the same as the n-th heating parameters, and the reference potential of the anode is greater than or equal to the threshold potential, comprises:

When the reference potential of the anode is smaller than the threshold potential, increasing the first temperature value to a second temperature value, and repeating steps S200 to S300 until the first temperature value is the same as a n-th temperature value, and the reference potential of the anode is greater than or equal to the threshold potential. When the reference potential of the anode is greater than the threshold potential, the n-th temperature value, the first amplitude value, the second time value and the third time value are recorded. By adjusting the temperature value of the temperature chamber while keeping other heating conditions unchanged, values of the reference potential of the anode at different temperature values of the temperature chamber are obtained, so as to obtain the influence of the temperature of the temperature chamber on the life of the battery. Please refer to FIG. 2, which is a test curve of changes of the reference potential of the anode with temperature when the positive and negative pulse amplitude value is 4C, the pulse period is 2 s and the state of charge is 50%. After the temperature is greater than −8° C., if the potential of the anode is greater than 0, it can be considered that Li plating does not occur. It can be found that with the decrease of temperature, the fluctuation amplitude of the reference potential of the anode increases.

Figure 3:
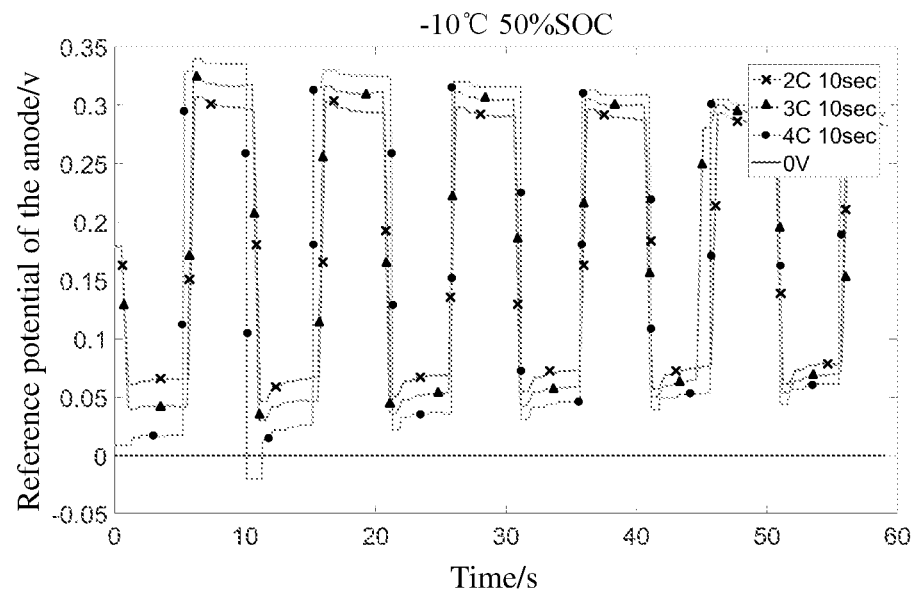
FIG. 3 is a diagram of the test results of the reference potential of the anode provided by an embodiment of the present application, which changes with pulse amplitude value.

In one of the embodiments, the step of when the reference potential of the anode is smaller than the threshold potential, adjusting the first heating parameters and repeating steps S200 to S300 until the first heating parameters are the same as the n-th heating parameters, and the reference potential of the anode is greater than or equal to the threshold potential, comprises:

When the reference potential of the anode is smaller than the threshold potential, reducing the first amplitude value to a second amplitude value and repeating steps S200 to S300 until the first temperature amplitude value is the same as a n-th amplitude value, and the reference potential of the anode is greater than or equal to the threshold potential. When the reference potential of the anode is greater than the threshold potential, the n-th amplitude value, the first temperature value, the second time value and the third time value are recorded. By adjusting the pulse amplitude value while keeping other heating conditions unchanged, values of the reference potential of the anode at different amplitude values are obtained, so as to obtain the influence of pulse amplitude value on the life of the battery. Please refer to FIG. 3, which is a test curve of changes of the reference potential of the anode with pulse amplitude value when the temperature of the temperature chamber is −10° C., the pulse period is 10 s and the state of charge is 50%. It can be found that with the increase of the pulse amplitude value, the fluctuation amplitude of the reference potential of the anode increases. During the charge pulse process in the second test period with the pulse amplitude value being 4C, if the potential of the anode is lower than 0V, it can be considered that Li plating has occurred to the battery. From the curve, it can be found that the larger the amplitude value, the greater the influence on the life of the battery will be. Therefore, in the initial period of pulsed heating, pulse parameters with a smaller amplitude value can be selected for heating, and after the temperature rises slightly, the pulse amplitude value is increased. In this way, the risk of Li plating can be further reduced.

In one of the embodiments, after the step S500 of when the reference potential of the anode is greater than the threshold potential, recording the n-th heating parameters, the recorded n-th heating parameters can be optimized to obtain a larger pulsed heating rate. By carrying out experimental tests under different ambient temperature and different pulse parameters, the fluctuations of the potential of the anode are analyzed, and a reasonable solution for pulse parameters is selected to ensure that the potential of the anode changes within a reasonable range and ensure a certain temperature rise rate. In general, there is a trade-off relationship between the effect of pulse parameters on the temperature rise rate and the effect on lithium dendrite precipitation on the anode. Therefore, a joint optimization method can be used to design better pulse parameters.

Figure 4:
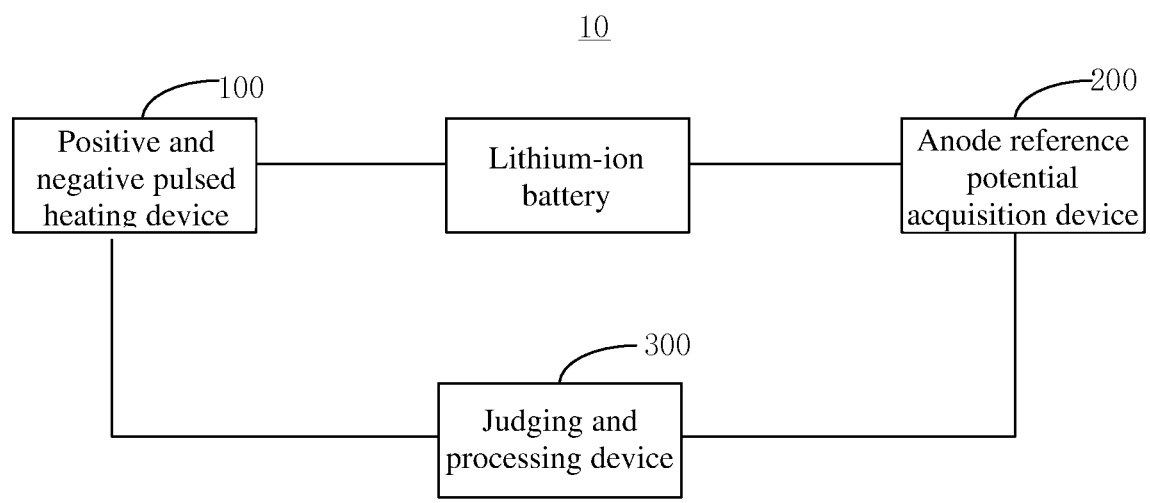
FIG. 4 is a structural view of a system for determining parameters of battery pulsed heating provided by an embodiment of the present application.

Please refer to FIG. 4. The present application provides a system 10 for determining parameters of battery pulsed heating. The system 10 for determining parameters of battery pulsed heating comprises a positive and negative pulsed heating device 100, an anode reference potential acquisition device 200 and a judging and processing device 300.

The positive and negative pulsed heating device 100 is electrically connected to a lithium-ion battery with a reference electrode and used for positive and negative pulsed heating of the lithium-ion battery. The anode reference potential acquisition device 200 is electrically connected to the lithium-ion battery, and used to obtain the reference potential of the anode of the lithium-ion battery. The reference potential of the anode is the voltage difference between the anode of the lithium-ion battery and the reference electrode. The judging and processing device 300 is electrically connected to the anode reference potential acquisition device 200 and the positive and negative pulsed heating device 100 respectively, and used to judge whether the reference potential of the anode is smaller than the threshold potential. When the reference potential of the anode is smaller than the threshold potential, the judging and processing device 300 sends the positive and negative pulsed heating device 100 a signal for adjustment of the heating parameters until the first heating parameters are the same as the n-th heating parameters and the reference potential of the anode is greater than the threshold potential. The n-th heating parameters are recorded.

The positive and negative pulsed heating device 100 can be built into an existing battery management system. The positive and negative pulsed heating device 100 may also be a charger that can provide positive and negative pulses. The anode reference potential acquisition device 200 may comprise a voltage sensor. The processing device 300 can be a microprocessor, single chip microcomputer (SCM), etc.

In an optional embodiment, the first heating parameters include a first temperature value, a first amplitude value, a second time value and a third time value, and when the judging and processing device 300 judges that the reference potential of the anode is smaller than the threshold potential, the judging and processing device 300 sends the positive and negative pulsed heating device 100 a signal for adjustment of the first temperature value.

In an optional embodiment, the first heating parameters include a first temperature value, a first amplitude value, a second time value and a third time value, and when the judging and processing device 300 judges that the reference potential of the anode is smaller than the threshold potential, the judging and processing device 300 sends the positive and negative pulsed heating device 100 a signal for adjustment of the first amplitude value.

In this embodiment, the aforementioned system for determining parameters of battery pulsed heating 10 obtains the reference potential of the anode of the lithium-ion battery in real time in the positive and negative pulsed heating process under various heating parameters through the anode reference potential acquisition device 200. The reference potential of the anode is the voltage difference between the anode of the lithium-ion battery and the reference electrode. The judging and processing device 300 judges the relationship between the reference potential of the anode and the threshold potential, and whether Li plating has occurred to the lithium-ion battery. Li plating may lead to a decrease in the available capacity of the battery, and puncture of the membrane by dendrite, which causes a short circuit in the battery and induces thermal runaway of the battery, bringing about many hazards such as performance reduction and safety risks. Therefore, when the reference potential of the anode is smaller than the threshold potential, the first heating parameters need to be adjusted to avoid the occurrence of Li plating and improve the life of the battery. By recording the heating parameters when the reference potential of the anode is greater than the threshold potential, it can be ensured that the pulsed heating parameters have no significant impact on the life of the battery.

The technical features of the aforementioned embodiments can be freely combined. In order to make the description concise, all possible combinations of the technical features in the aforementioned embodiments are not described. However, as long as there is no contradiction in the combinations of these technical features, they should be considered to be within in the scope of this specification.

The aforementioned embodiments only represent a few ways of implementing the present application. Their descriptions are concrete and detailed, but they shall not be therefore understood as limitations to the scope of the patent under application. It should be noted that for those of ordinary skill in the art, various changes and modifications may be made to the embodiments without departing from the conception of the present application. All these fall within the scope of protection of the present application. Therefore, the scope of protection of the patent under the present application shall be subject to the appended claims.

We claim:

1. A method for determining parameters of battery pulsed heating, comprising:
   (i) providing a lithium-ion battery with a reference electrode;
   (ii) connecting the lithium-ion battery with a positive and negative pulsed heating device and performing positive and negative pulsed heating of the lithium-ion battery under first heating parameters, wherein the performing comprises;

putting the lithium-ion battery in a temperature chamber set at a first temperature for a first time period,
charging the lithium-ion battery at a first amplitude in a constant-current mode for a second time period, and
discharging the lithium-ion battery at the first amplitude in a constant-current mode for a third time period,
wherein the first heating parameters comprise the first temperature, the first amplitude, the second time period, and the third time period (iii) obtaining a reference potential of an anode of the lithium-ion battery in real time during the positive and negative pulsed heating of step (ii), wherein the reference potential of the anode is a voltage difference between the anode of the lithium-ion battery and the reference electrode, and determining whether the reference potential of the anode is smaller than a threshold potential;

(iv) signaling the positive and negative pulsed heating device to adjust the first heating parameters when the reference potential of the anode determined in step (iii) is smaller than the threshold potential, wherein adjusting the first heating parameters comprises increasing the first temperature to an n-th temperature, keeping the first amplitude, the first time period, and the second time period constant, and repeating steps (ii) to (iii) until the reference potential of the anode is equal to or greater than the threshold potential; and (v) recording the n-th temperature, the first amplitude, the second time period, and the third time period, when the reference potential of the anode determined in step (iii) is greater than the threshold potential.

2. The method for determining parameters of battery pulsed heating according to claim 1, wherein after step (v), the method further comprises:
analyzing fluctuations of the reference potential of the anode and selecting pulsed parameters based on a desired temperature rise rate.

3. The method for determining parameters of battery pulsed heating according to claim 1, wherein the reference electrode is one of a lithium metal reference electrode, an alloy reference electrode, a polymer material coated reference electrode and a battery in-situ lithium plating reference electrode.

4. A system for determining parameters of battery pulsed heating, comprising:
a temperature chamber adapted to receive a lithium-ion battery therein;
a positive and negative pulsed heating device, electrically connected to the lithium-ion battery with a reference electrode and configured for positive and negative pulsed heating of the lithium-ion battery under first heating parameters that comprise a first temperature, a first amplitude, a second time period, and a third time period;
an anode reference potential acquisition device, electrically connected to the lithium-ion battery and configured to acquire a reference potential of an anode of the lithium-ion battery, which is a voltage difference between the anode and the reference electrode; and
a judging and processing device, electrically connected to the anode reference potential acquisition device and the positive and negative pulsed heating device, configured to:
determine whether the reference potential of the anode is smaller than a threshold potential,
send the positive and negative pulsed heating device a signal to adjust the first heating parameters by increasing the first temperature to an n-th temperature when the reference potential of the anode is smaller than the threshold potential and until the reference potential of the anode is equal to or greater than the threshold potential, and
record the n-th temperature, the first amplitude, the second time period, and the third time period when the reference potential of the anode is greater than the threshold potential.

5. The system for determining parameters of battery pulsed heating according to claim 4, wherein the judging and processing device is configured to:
send the positive and negative pulsed heating device a signal to adjust the first amplitude when the reference potential of the anode is smaller than the threshold potential.

* * * * *